(12) United States Patent
Iizuka et al.

(10) Patent No.: US 11,990,051 B2
(45) Date of Patent: May 21, 2024

(54) FLIGHT SYSTEM, FLIGHT ROUTE DETERMINATION METHOD, AND FLIGHT ROUTE DETERMINATION DEVICE

(71) Applicant: Rakuten Group, Inc., Tokyo (JP)

(72) Inventors: Takahiro Iizuka, Tokyo (JP); Hirofumi Kokubun, Tokyo (JP); Kenichi Lee, Musashino (JP)

(73) Assignee: Rakuten Group, Inc., Tokyo (JP)

(*) Notice: Subject to any disclaimer, the term of this patent is extended or adjusted under 35 U.S.C. 154(b) by 251 days.

(21) Appl. No.: 17/383,598

(22) Filed: Jul. 23, 2021

(65) Prior Publication Data

US 2022/0092990 A1 Mar. 24, 2022

(30) Foreign Application Priority Data

Sep. 24, 2020 (JP) .................................. 2020-159946

(51) Int. Cl.
| | |
|---|---|
| G08G 5/00 | (2006.01) |
| B60L 58/13 | (2019.01) |
| B64C 39/02 | (2023.01) |
| B64U 50/19 | (2023.01) |
| B64U 101/30 | (2023.01) |
| G05D 1/00 | (2006.01) |

(52) U.S. Cl.
CPC .............. *G08G 5/006* (2013.01); *B60L 58/13* (2019.02); *B64C 39/024* (2013.01); *G05D 1/0607* (2013.01); *G08G 5/0069* (2013.01); *B60L 2200/10* (2013.01); *B64U 50/19* (2023.01); *B64U 2101/30* (2023.01); *B64U 2201/10* (2023.01)

(58) Field of Classification Search
None
See application file for complete search history.

(56) References Cited

U.S. PATENT DOCUMENTS

| | | | | |
|---|---|---|---|---|
| 11,074,447 | B1* | 7/2021 | Caruana | G08G 5/0013 |
| 2014/0077969 | A1* | 3/2014 | Vian | G08B 13/00 340/870.02 |
| 2018/0068416 | A1* | 3/2018 | Chandra | G01C 11/025 |
| 2018/0293896 | A1* | 10/2018 | Dow | B64C 39/024 |
| 2018/0348760 | A1* | 12/2018 | Peverill | G05D 1/0088 |
| 2018/0350054 | A1* | 12/2018 | Fox | A01K 29/005 |
| 2019/0103032 | A1* | 4/2019 | Sasaki | G08G 5/0034 |
| 2019/0244530 | A1* | 8/2019 | Chun | B64C 39/024 |
| 2019/0258883 | A1* | 8/2019 | Britto Mattos Lima | G06V 20/13 |
| 2019/0362640 | A1* | 11/2019 | Wu | G08G 5/003 |
| 2020/0178458 | A1* | 6/2020 | Winarski | B64D 1/18 |

FOREIGN PATENT DOCUMENTS

| | | |
|---|---|---|
| JP | 2011-254711 A | 12/2011 |
| JP | 2018-169995 A | 11/2018 |
| JP | 2019-158635 A | 9/2019 |
| WO | 2020/090589 A1 | 5/2020 |

OTHER PUBLICATIONS

English-language translation of the concise explanation of relevance for JP2018-169995, JP2019-158635 and WO2020/090589.

* cited by examiner

*Primary Examiner* — Christian Chace
*Assistant Examiner* — Shayne M. Gilbertson
(74) *Attorney, Agent, or Firm* — Sughrue Mion, PLLC

(57) ABSTRACT

A flight system S acquires contact sensing data obtained by a contact sensing of a soil sensor unit 1 embedded in advance in the ground, and determines a flight route for an UAV 2 to execute a predetermined task on the basis of the contact sensing data.

18 Claims, 15 Drawing Sheets

FIG. 8

| SENSING AREA | WATER AMOUNT | TEMPERATURE | NECESSITY OF TASK EXECUTION |
|---|---|---|---|
| No.1 | 4% | 15°C | EXECUTION IS UNNECESSARY |
| No.2 | 3% | 13°C | EXECUTION IS NECESSARY |
| No.3 | 7% | 20°C | EXECUTION IS NECESSARY |
| ... | ... | ... | ... |

FIG. 9B

| PRIORITY BASED ON DISEASE HISTORY IN GREEN | | | | | | | | | | | | | | | | | | |
|---|---|---|---|---|---|---|---|---|---|---|---|---|---|---|---|---|---|---|
| NUMBER OF HOLES | 1 | 2 | 3 | 4 | 5 | 6 | 7 | 8 | 9 | 10 | 11 | 12 | 13 | 14 | 15 | 16 | 17 | 18 |
| SCORE | 10 | 0 | 15 | 3 | 0 | 5 | 8 | 7 | 1 | 0 | 6 | 5 | 0 | 4 | 2 | 3 | 6 | 10 |
| PRIORITY | 2 | 11 | 1 | 8 | 11 | 6 | 3 | 4 | 10 | 11 | 5 | 6 | 11 | 7 | 9 | 8 | 5 | 2 |

FIG. 10B

| IMPORTANCE LEVEL OF GREEN | | | | | | | | | | | | | | | | | | |
|---|---|---|---|---|---|---|---|---|---|---|---|---|---|---|---|---|---|---|
| NUMBER OF HOLES | 1 | 2 | 3 | 4 | 5 | 6 | 7 | 8 | 9 | 10 | 11 | 12 | 13 | 14 | 15 | 16 | 17 | 18 |
| IMPORTANCE LEVEL | H | M | L | L | L | M | M | H | L | M | L | H | L | M | M | H | L | L |

FIG. 10C

| PRIORITY BASED ON IMPORTANCE LEVEL AND DISEASE HISTORY IN GREEN | | | | | | | | | | | | | | | | | | |
|---|---|---|---|---|---|---|---|---|---|---|---|---|---|---|---|---|---|---|
| NUMBER OF HOLES | 1 | 2 | 3 | 4 | 5 | 6 | 7 | 8 | 9 | 10 | 11 | 12 | 13 | 14 | 15 | 16 | 17 | 18 |
| SCORE | 13 | 2 | 16 | 4 | 1 | 7 | 10 | 10 | 2 | 2 | 7 | 8 | 13 | 6 | 4 | 6 | 7 | 11 |
| PRIORITY | 2 | 9 | 1 | 8 | 10 | 6 | 4 | 4 | 9 | 9 | 6 | 5 | 2 | 7 | 8 | 7 | 6 | 3 |

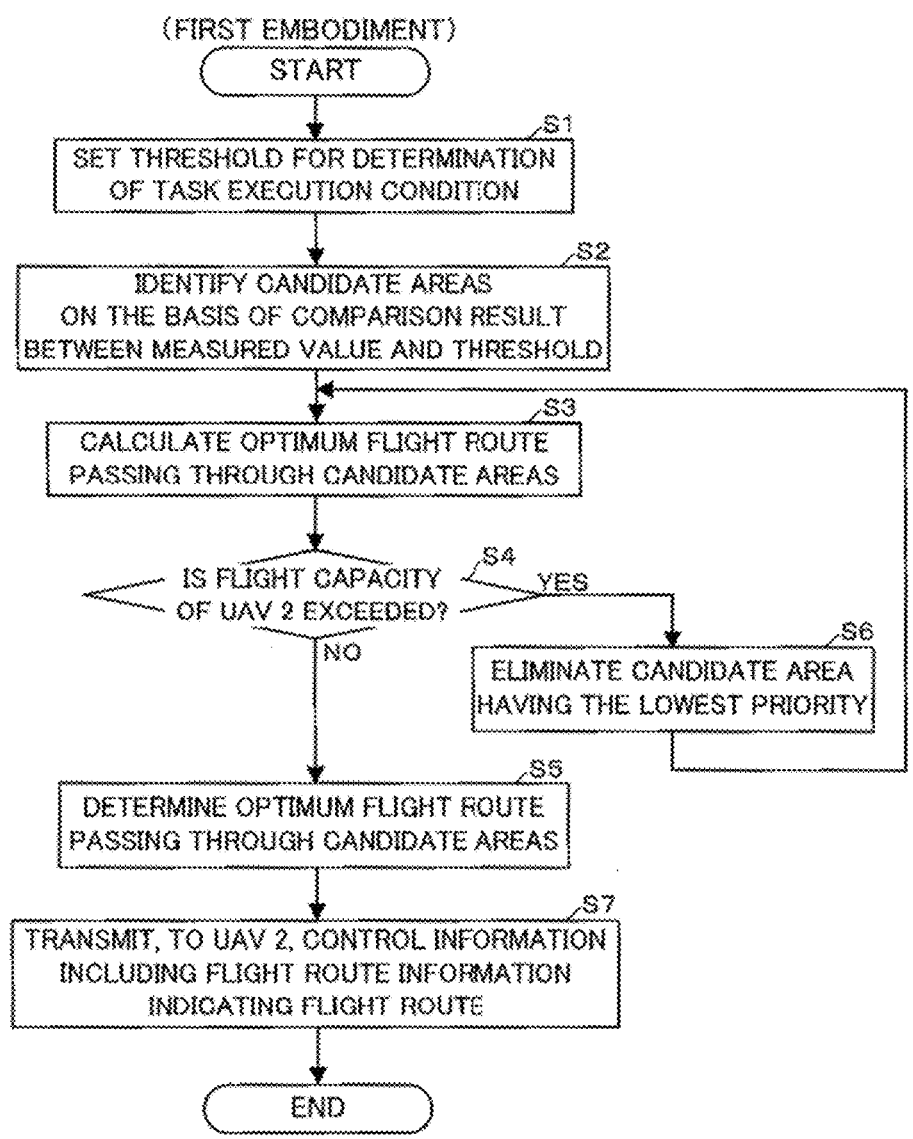

FLIGHT SYSTEM, FLIGHT ROUTE DETERMINATION METHOD, AND FLIGHT ROUTE DETERMINATION DEVICE

CROSS REFERENCE TO RELATED APPLICATION

This application claims priority from Japanese Patent Application No. 2020-155946 which was filed on Sep. 24, 2020, the disclosure of which is herein incorporated by reference in its entirety.

TECHNICAL FIELD

One or more embodiments of the present invention relate to a technical field of, for example, a flight route determination system that makes an aerial vehicle capable of unmanned flight execute a predetermined task.

RELATED ART

It has been studied to utilize an aerial vehicle capable of unmanned flight for management of soil and plants planted in the soil. For example, JP 2011-254711 A discloses a technique in which a video camera mounted on an industrial unmanned helicopter is used to film an entire field to acquire images and data indicating the reflectance of natural light, while a part of soil in the field is sampled for measurement of hot water-extractable nitrogen, and a distribution map of hot water-extractable nitrogen of the entire field is generated.

However, in the technique as described above, an aerial vehicle is tasked to film an entire area to be targeted, and therefore, in the case of a wide area, the flight time of the aerial vehicle is sometimes so long that there has been room for improvement in terms of efficiency.

Therefore, one or more embodiments of the present invention are directed to providing a flight system, a flight route determination method, and a flight route determination device that can make an aerial vehicle execute a predetermined task further efficiently.

SUMMARY

In response to the above issue, the transport system includes: an aerial vehicle capable of unmanned flight, the aerial vehicle being configured to execute a predetermined task during flight; a contact sensor configured to be embedded in ground in advance and perform contact sensing of at least one sensing target of soil or a plant; and at least one memory configured to store program code; and at least one processor configured to access the program code and operate as instructed by the program code. The program code includes determination code configured to cause at least one processor to determine, on the basis of contact sensing data obtained by the contact sensing performed by the contact sensor, a flight route for the aerial vehicle to execute the predetermined task.

The determination code may cause the at least one processor to determine the flight route further on the basis of at least one of a battery consumption amount or a battery remaining amount of the aerial vehicle.

The determination code may cause the at least one processor to identify, on the basis of the contact sensing data, one or a plurality of areas in which the predetermined task is to be executed, and determine the flight route on the basis of the one or plurality of areas.

The determination code may cause the at least one processor to identify, on the basis of the contact sensing data, a plurality of candidate areas as a candidate for an area in which the predetermined task is to be executed, to compare the battery remaining amount with the battery consumption amount of the aerial vehicle in a case where the aerial vehicle flies along a flight route for execution of the predetermined task in the plurality of candidate areas, and to identify, on the basis of a result of the comparison, one or a plurality of areas in which the predetermined task is to be executed.

The determination code may cause the at least one processor to reduce a number of the plurality of candidate areas until, in the case where the aerial vehicle flies along a flight route for execution of the predetermined task in the plurality of candidate areas, the battery consumption amount is less than the battery remaining amount.

The determination code may cause the at least one processor to determine the flight route by selecting one flight route, on the basis of the contact sensing data, from a plurality of flight route candidates prepared in advance.

The determination code may cause the at least one processor to identify, on the basis of the contact sensing data, one or a plurality of candidate areas as a candidate for an area in which the predetermined task is to be executed, to compare the one or plurality of candidate areas with one or a plurality of areas corresponding to at least one of the plurality of flight route candidates, and to select the one flight route on the basis of a result of the comparison.

The determination code may cause the at least one processor to reduce a number of the one or plurality of candidate areas until the one or plurality of candidate areas match the one or plurality of areas corresponding to the flight route candidates.

The determination code may cause the at least one processor to eliminate one of the plurality of candidate areas, the one having priority relatively low.

The program code may further include setting code configured to cause at least one processor to set the priority on the basis of a past disease history in the one of the plurality of candidate areas.

The program code may further include setting code configured to cause at least one processor to set the priority that changes according to a value indicated by the contact sensing data.

The program code may further include setting code configured to cause at least one processor to set the priority that is lower as a distance from a reference position to the one of the plurality of candidate areas is longer.

The flight system may further include a controller configured to make the aerial vehicle execute the predetermined task.

The controller may make the aerial vehicle execute aerial non-contact sensing of a ground surface as the predetermined task.

The controller may make the aerial vehicle lower a flight altitude of the aerial vehicle to execute the aerial non-contact sensing, and after the aerial non-contact sensing, make the aerial vehicle raise the flight altitude to fly.

A target of the aerial non-contact, sensing may be a plant growing from ground in an area accessible to a person.

The controller may make the aerial vehicle execute aerial application of an application material as the predetermined task.

A flight route determination method executed by one or a plurality of computers, includes: acquiring contact sensing data obtained by contact sensing of at least one sensing target of soil or a plant, the contact sensing performed by a contact sensor embedded in ground in advance; and determining, on the basis of the contact sensing data, a flight route for an aerial vehicle capable of unmanned flight to execute a predetermined task.

A flight route determination device includes: at least one memory configured to store program code; and at least one processor configured to access the program code and operate as instructed by the program code. The program code includes: acquisition code configured to cause at least one processor to acquire contact sensing data obtained by contact sensing of at least one sensing target of soil or a plant, the contact sensing performed by a contact sensor embedded in ground in advance; and determination code configured to cause at least one processor to determine, on the basis of the contact sensing data, a flight route for an aerial vehicle capable of unmanned flight to execute a predetermined task.

BRIEF DESCRIPTION OF THE DRAWINGS

FIG. 8 is a table showing an example of a relationship between measured values indicated fey contact sensing data in each of a plurality of sensing areas and necessity of task execution in a sensing area.

FIG. 9B is a table showing a priority set for each green on the basis of the disease history shown in FIG. 9A.

FIG. 10B is a table showing an example of an importance level, in a case where a green is a candidate area, of each green.

FIG. 10C is a table showing an example of a priority set for each green on the basis of the disease history shown in FIG. 10A and the importance level shown in FIG. 10B.

FIG. 11 is a flowchart showing an example of the process of the control unit 33 of the management server 3 in a first embodiment.

DETAILED DESCRIPTION

Hereinafter, an embodiment of the present invention will be described with reference to the drawings.

1. Configuration of Flight System S

Figure 1:
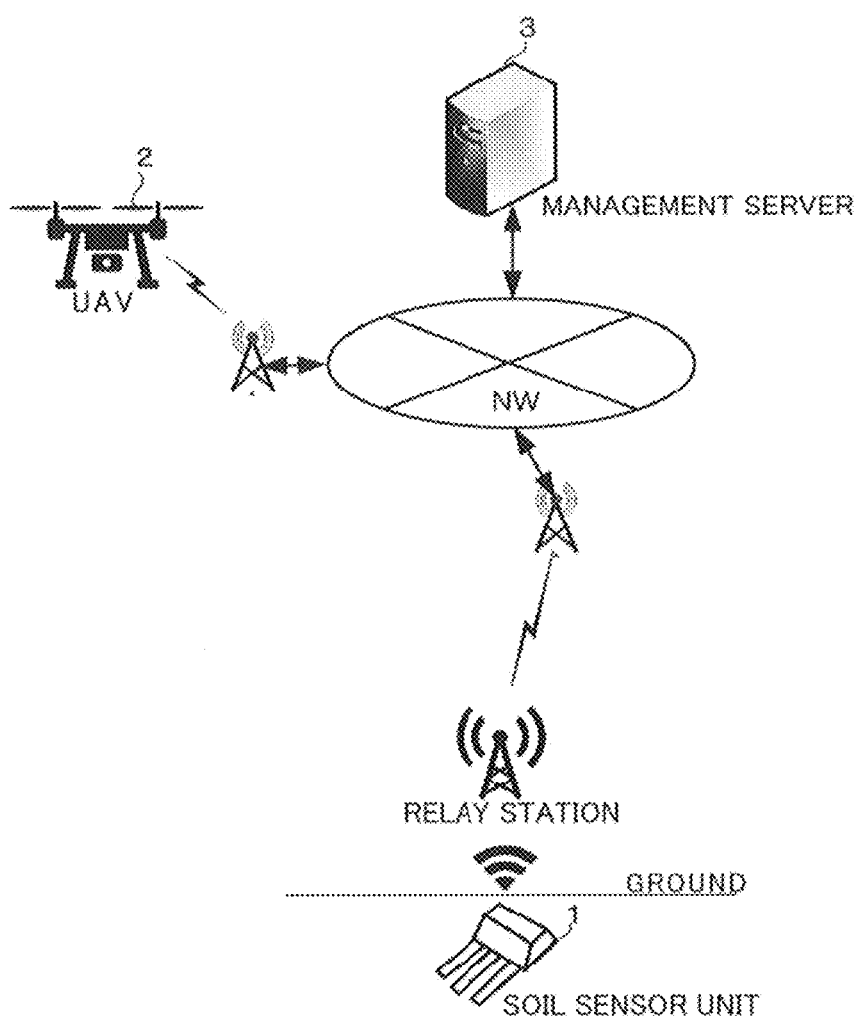
FIG. 1 is a diagram illustrating a schematic configuration example of a flight system S.

First, a configuration of a flight system S according to an embodiment of the present invention will be described with reference to FIG. 1. FIG. 1 is a diagram illustrating a schematic configuration example of the flight system S. As illustrated in FIG. 1, the flight system S includes a soil sensor unit 1, an unmanned aerial vehicle (hereinafter, referred to as UAV) 2, and a management server 3. The soil sensor unit 1 can communicate with a relay station (repeater) installed on the ground. The relay station can receive data (radio waves) transmitted from the soil sensor unit 1 and transfer the data to the management server 3 via a communication network NW. The UAV 2 can communicate with the management server 3 via the communication network NW. The communication network NW includes, for example, the Internet, a mobile communication network, a radio base station thereof, and the like.

Incidentally, the UAV 2 is an example of an aerial vehicle capable of unmanned flight, and is also called a drone or a multicopter. The UAV 2 can fly under remote control of an operator on the ground, or fly autonomously. Moreover, the UAV 2 is managed by a GCS (Ground Control Station). The GCS may be, for example, mounted as an application on a control terminal operated by an operator, or may be configured with a server such as the management server 3.

1-1. Configuration and Function of Soil Sensor Unit 1

Figure 2:
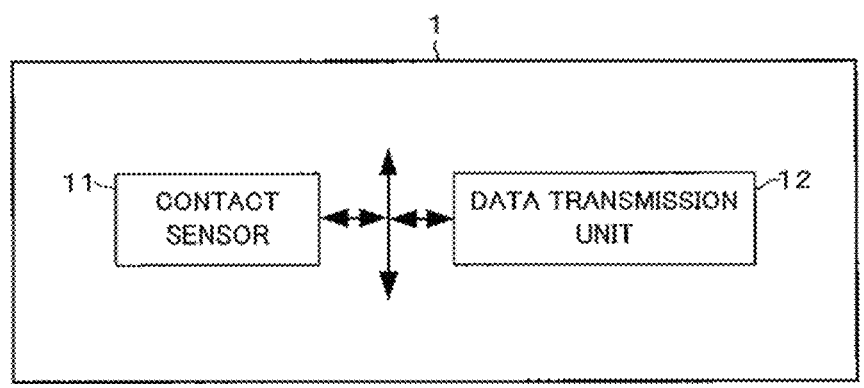
FIG. 2 is a diagram illustrating a schematic configuration example of a soil sensor unit 1.

Next, a configuration and a function of the soil sensor unit 1 will be described with reference to FIG. 2. FIG. 2 is a diagram illustrating a schematic configuration example of the soil sensor unit 1. As illustrated in FIG. 2, the soil sensor unit 1 includes a contact sensor 11, a data transmission unit 12, and the like. The soil sensor unit 1 is embedded in the ground in a predetermined area (hereinafter, referred to as sensing area) in advance (that is, the flight system S operates in a state in which the soil sensor unit 1 is arranged in advance). A plurality of sensing areas may each have a soil sensor unit 1 embedded in the ground in advance. Moreover, one sensing area may have a plurality of soil sensor units 1 embedded in advance at regular intervals or irregular intervals. The sensing area is an area that is to be maintained in a golf course, a ball game ground, or the like. An area in which care for a plant growing from the ground is particularly important (such as an area accessible to a person) is to be set as a sensing area. Examples of such a sensing area include a green in a golf course. In this case, for example, each green in 18 holes of the golf course has the soil sensor unit 1 embedded in advance.

The contact sensor 11 performs contact sensing of at least one sensing target of soil or a plant (for example, root of the plant) in a sensing area. Here, the term "contact sensing" means measuring, for example, at least one of water amount (water content), temperature, salinity concentration, electrical conductivity, acidity, or the like of the sensing target in contact with the contact sensor 11. Such contact sensing is to be continually performed in time series, and the time interval of the contact sensing may be constant or indefinite. Incidentally, at least one of the water amount, the temperature, the salinity concentration, the electrical conductivity, the acidity, or the like may be measured in a proximity range of the sensing target in contact with the contact sensor 11 (for example, a range of several cm to several tens of cm with which the contact sensor 11 is not in contact). The range that can be subjected to contact sensing is the point where the soil sensor unit 1 is embedded and the proximity range of the point. Therefore, the range that can be subjected to contact sensing with one soil sensor unit 1 is basically narrower than the sensing area.

The data transmission unit 12 modulates contact sensing data obtained through contact sensing by the contact sensor 11 and a sensor ID of the soil sensor unit 1, and transmits radio waves carrying the contact sensing data and the sensor ID (using, for example, 920 MHz band). Here, the contact sensing data are measurement data indicating at least one of the water amount, the temperature, the salinity concentration, the electrical conductivity, the acidity, or the like measured as described above. The sensor ID is identification information with which the soil sensor unit 1 can be identified. The sensor ID is stored in the soil sensor unit 1 in advance. Incidentally, the sensor ID may be position information indicating the position (latitude and longitude) of the soil sensor unit 1. In this case, the position information is measured in advance, for example, at the time of burying the soil sensor unit 1 in the ground, and is stored in the soil sensor unit 1 in advance.

Figure 3:
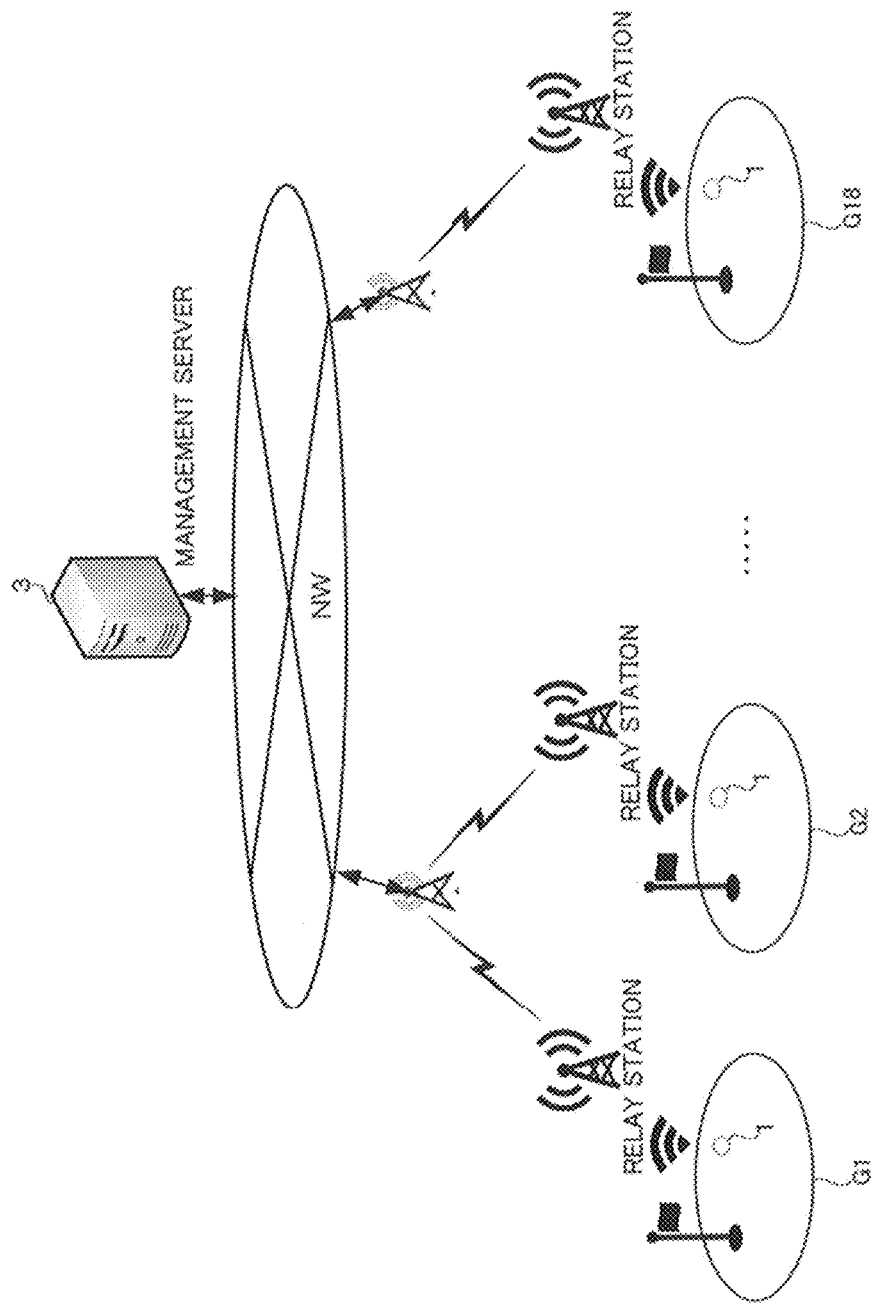
FIG. 3 is a conceptual diagram illustrating how radio waves are transmitted from each soil sensor unit 1 embedded in the ground in greens G1 to G18 in a golf course.

The radio waves including the contact sensing data and the sensor ID are to be transmitted continually in time series, and the time interval of the transmission may be constant or indefinite. FIG. 3 is a conceptual diagram illustrating how radio waves are transmitted from each soil sensor unit 1 embedded in the ground in greens G1 to G18 in a golf course. In the example in FIG. 3, the contact sensing data and the like (radio waves) transmitted from the soil sensor unit 1 embedded in each of the greens G1 to G18 are transmitted to the management server 3 via a relay station within the communicable range with the soil sensor unit 1 and via the communication network NW. Incidentally, the data transmission unit 12 may be configured to be able to communicate with a radio base station of a mobile communication network without passing through a relay station.

[1-2. Configuration and Function of UAV 2]

Figure 4:
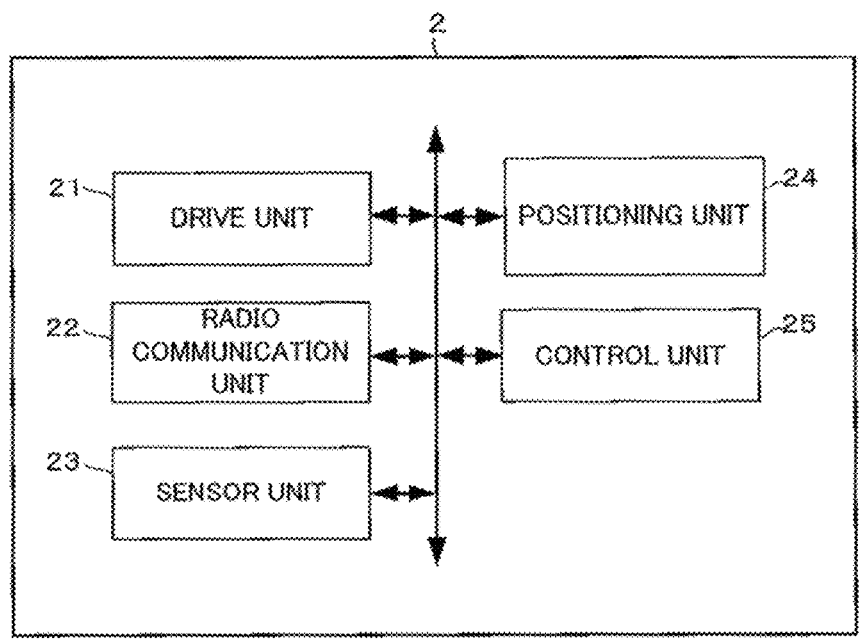
FIG. 4 is a diagram illustrating a schematic configuration example of an UAV 2.
Figure 5:
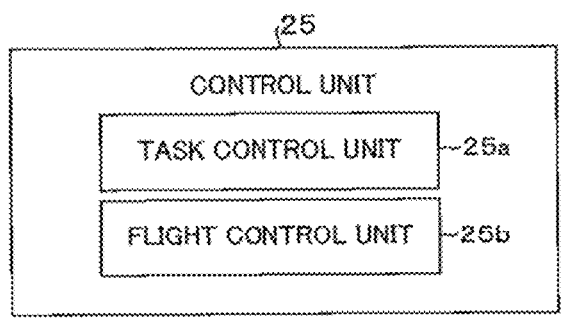
FIG. 5 is a diagram illustrating an example of functional blocks in a control unit 25.

Next, a configuration and a function of the UAV 2 will be described with reference to FIGS. 4 and 5. FIG. 4 is a diagram illustrating a schematic configuration example of the UAV 2. As illustrated in FIG. 4, the UAV 2 includes a drive unit 21, a radio (wireless) communication unit 22, a sensor unit 23, a positioning unit 24, a control unit 25, and the like. Incidentally, although not illustrated, the UAV 2 includes a rotor (propeller) as a horizontal rotary wing, and a battery that supplies power to each unit of the UAV 2. Furthermore, the UAV 2 may include an application mechanism (e.g., spraying mechanism) for aerial application (e.g., aerial spraying) of an application material in the sensing area. Examples of the application material include water, chemicals, and fertilizers. Such an application material is stored, for example, in a tank provided for the application mechanism. The drive unit 21 includes a motor, a rotation shaft, and the like. The drive unit 21 rotates a plurality of rotors with the motor, the rotation shaft, and the like that are driven in accordance with a control signal output from the control unit 25. The radio communication unit 22 controls communication with the management server 3 via the communication network NW.

The sensor unit 23 includes various sensors necessary for flight control of the UAV 2. The various sensors include an optical sensor, a battery sensor, a three-axis angular velocity sensor, a three-axis acceleration sensor, a geomagnetic sensor, and the like. The detection data detected by the sensor unit 23 are output to the control unit 25. The optical sensor includes, for example, a camera (an RGB camera or an infrared camera), and is also used for non-contact sensing of the ground surface in the sensing area from the air. Here, the term "non-contact sensing" refers to observing the state (situation) of the ground surface by capturing the ground surface within a range that can be subjected to non-contact sensing (for example, a range in the angle of view of the camera). Such non-contact sensing (aerial non-contact sensing) is performed one or more times, for example, at the time of arriving at the sensing area of the UAV 2. Incidentally, the non-contact sensing is to be continually performed in time series for improvement in the accuracy of the sensing, and the time interval of the non-contact sensing may be constant or indefinite.

The battery sensor is a sensor configured to monitor at least one of a battery consumption amount or a battery remaining amount of the UAV 2. At least one of the battery consumption amount or the battery remaining amount is continually detected a plurality of times as time passes. The time interval of the detection of at least one of the battery consumption amount or the battery remaining amount may be constant or indefinite. Battery information indicating at least one of the battery consumption amount or the battery remaining amount detected by the battery sensor is output to the control unit 25 in time series.

The positioning unit 24 includes a radio wave receiver, an altitude sensor, and the like. The positioning unit 24 receives, for example, a radio wave transmitted from a GNSS (Global Navigation Satellite System) satellite with the radio wave receiver, and detects the current position (latitude and longitude) of the UAV 2 in the horizontal direction on the basis of the radio wave. The current position of the UAV 2 is the flight position of the UAV 2 during flight. Incidentally, the current position of the UAV 2 in the horizontal direction may be corrected on the basis of the image captured by the optical sensor or the radio wave transmitted from the radio base station. The position information indicating the current position detected by the positioning unit 24 is output to the control unit 25. Furthermore, the positioning unit 24 may detect, the current position of the UAV 2 in the vertical direction (altitude) with the altitude sensor such as an atmospheric pressure sensor. In this case, the position information includes the altitude information indicating the altitude of the UAV 2.

The control unit 25 includes at least one CPU (Central Processing Unit) as a processor, a ROM (Read Only Memory), a RAM (Random Access Memory), a nonvolatile memory, and the like. FIG. 5 is a diagram illustrating an example of functional blocks in the control unit 25. The control unit 25 functions as a task control unit 25a and a flight control unit 25b as illustrated in FIG. 5 according to, for example, a program (program code group) stored in the ROM or the nonvolatile memory. Incidentally, the control unit 25 makes the radio communication unit 22 transmit the battery information from the battery sensor and an aircraft ID to the management server 3 (or to the management server 3 via the GCS) before the UAV 2 starts a flight to execute a predetermined task. The aircraft ID is identification information with which the UAV 2 can be identified. Moreover, the control unit 25 makes the radio communication unit 22 transmit the position information and the aircraft ID of the UAV 2 successively to the management server 3 (or to the management server 3 via the GCS) while the UAV 2 is in flight.

The task control unit 25a controls the UAV 2 to execute the predetermined task. That is, the task control unit 25a (an example of a controller) is configured to make the UAV 2 execute the predetermined task. For example, the task control unit 25a makes the sensor unit 23 execute non-contact sensing of the ground surface in the sensing area from the air as the predetermined task. Alternatively, the task control unit 25a may make the application mechanism execute aerial application of an application material in the sensing area as the predetermined task. In the case of executing non-contact sensing as a task, the task control unit 25a controls the UAV 2 to reduce the flight altitude and execute the non-contact sensing, and after the non-contact sensing, increase the flight altitude and fly. By this control, the accuracy of the non-contact sensing can be enhanced. That is, the task control unit 25a makes the UAV 2 lower a flight altitude of the UAV 2 to execute the non-contact sensing, and after the non-contact sensing, makes the UAV 2 raise the flight altitude to fly. Then, the radio communication unit 22 transmits the non-contact sensing data obtained by the non-contact sensing to the management server 3. Here, the non-contact sensing data may be raw detection data output from the sensor unit 23, or may be data analyzed and processed on the basis of the output raw detection data. Such non-contact sensing data are data constituting at least one map image of, for example, an RGB image of the ground surface in the sensing area, a NDVI (Normalized Difference Vegetation Index) distribution image, or a thermal image (temperature partial image).

Incidentally, the NDVI is a value indicating the relationship between the health condition of a plant growing from the ground in a sensing area accessible to a person and the reflectance at each wavelength from the visible range to the near-infrared range. For example, a plant has a characteristic of absorbing radio waves in the visible has a characteristic of absorbing radio waves in the near-infrared range, and therefore a higher NDVI value means a better health condition. The map image has pixel values, or temperatures that are measured values) each linked with position information. Such position information (that is, the position information in the non-contact sensing data) is identified by, for example, position information indicating the current position of the UAV 2 in the horizontal direction and SLAM (Simultaneous Localization And Mapping) process (simultaneous process of map generation and self-position estimation).

The flight control unit 25b executes flight control of the UAV 2. In the flight control, the rotation speed of the rotor and the position, the attitutude, and the moving direction of the UAV 2 are controlled using the detection data from the sensor unit 23, the position information from the positioning unit 24, the flight route information indicating a flight route for execution of the task, and the like. Here, the flight route information is acquired from, for example, the management server 3. The flight control unit 25b can remotely control the UAV 2 to fly or make the UAV 2 fly autonomously to the sensing area along the flight route indicated by the flight route information. Incidentally, the autonomous flight of the UAV 2 is not limited to the autonomous flight under the flight control by the flight control unit 25b, and examples of the autonomous flight of the UAV 2 include the autonomous flight under the flight control by the entire flight system S.

1-3. Configuration and Function of Management Server 3

Figure 6:
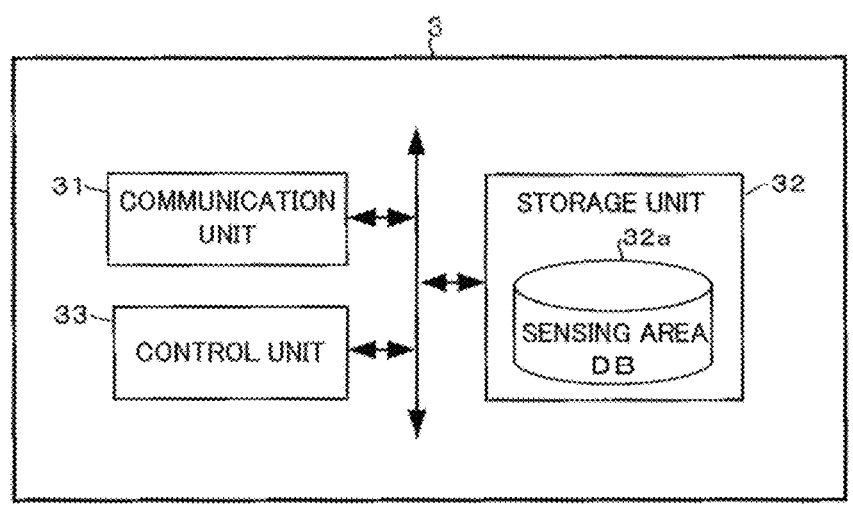
FIG. 6 is a diagram illustrating a schematic configuration example of a management server 3.

Next, a configuration and a function of the management server 3 will be described with reference to FIGS. 6 and 7. FIG. 6 is a diagram illustrating a schematic configuration example of the management server 3. As illustrated in FIG. 6, the management server 3 includes a communication unit 31, a storage unit 32, a control unit 33, and the like. The communication unit 31 controls communication between the relay station of the soil sensor unit 1 and the UAV 2 via the communication network NW. The communication unit 31 receives the contact sensing data transmitted from the relay station. The storage unit 32 includes, for example, a hard disk drive and the like. The storage unit 32 is provided with a sensing area database (DB) 32a.

The sensing area database 32a stores area information, a sensor ID, and contact sensing data that are linked with each sensing areas. Here, the area information includes, for example, the name of a sensing area and position information indicating the position of the sensing area. For example, in a case where the sensing area is a green in a golf course, the name of the hole (for example, first hole) is shown as the name of the sensing area. The sensor ID linked with the area information is the sensor ID of the soil sensor unit 1 embedded in the ground in the sensing area indicated by the area information. In a case where a plurality of soil sensor unit are embedded in the sensing area, the sensor ID of each soil sensor unit 1 is linked with the area information. As described above, the contact sensing data indicate a measured value of at least one of the water amount, the temperature, the salinity concentration, the electrical conductivity, the acidity, or the like of the sensing target.

Incidentally, the sensing area database 32a may store a past disease history, linked with area information, in a sensing area (such as a green). The disease history includes the name and the occurrence date and time of a disease. Moreover, the sensing area database 32a may store an importance level, linked with area information, that is determined on the basis of discretion of, for example, the administrator of the sensing area (for example, in accordance with an experimental rule or an experimental evidence). For example, the importance level of a sensing area with poor drainage or poor air flow due to the relief feature is determined to be high. The disease history and the importance level are used for setting of a priority (for example, the priority order for execution of a task) of each sensing area in a plurality of sensing areas.

The control unit 33 includes at least one CPU (an example of processor), a ROM, a RAM, a nonvolatile memory, and the like. The ROM or the non-volatile memory is configured to store a program (program code). The CPU is configured to access the program code and operate as instructed by the program code. The program code includes: acquisition code configured to cause the CPU to acquire the contact sensing data; and determination code configured to cause the CPU to determine, on the basis of the contact sensing data, a flight route for the UAV 2 to execute the predetermined task. Further, the program code may include setting code configured to cause the CPU to set the priority on the basis of the past disease history in the one of the plurality of candidate areas. Further, the program code may include setting code configured to cause the CPU to set the priority that changes according to a value indicated by the contact sensing data. Further, the program code may include setting code configured to cause the CPU to set the priority that is lower as a distance from a reference position to the one of the plurality of candidate areas is longer.

Figure 7:
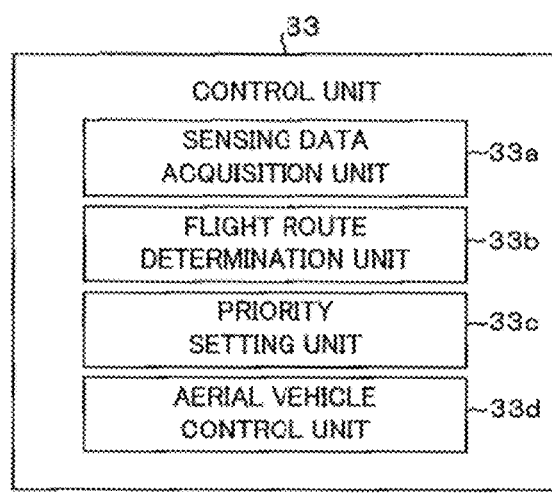
FIG. 7 is a diagram illustrating an example of functional blocks in a control unit 33.

FIG. 7 is a diagram illustrating an example of functional blocks in the control unit 33. As illustrated in FIG. 7, the control unit 33 functions as a sensing data acquisition unit 33a, a flight route determination unit 33b, a priority setting unit 33c, an aerial vehicle control unit 33d, and the like in accordance with, for example, a program (program code) stored in the ROM or the nonvolatile memory.

The sensing data acquisition unit 33a acquires the contact sensing data and the sensor ID transmitted from the soil sensor unit 1 via the communication unit 31, and stores the contact sensing data and the sensor ID that are linked with the area information in the sensing area database 33a.

On the basis of the contact sensing data acquired by the sensing data acquisition unit 33a, the flight route determination unit 33b determines a flight route for the UAV 2 to execute the predetermined task. For example, on the basis of a comparison result between the measured values indicated by the contact sensing data and a threshold, the flight route determination unit 33b determines the flight route passing through a position (or a vicinity range of the position) of the soil sensor unit 1 that has provided (transmitted) the measured value satisfying a task execution condition. Here, the threshold is set in advance according to the property of the sensing target, such as the water amount or the temperature. The phrase "satisfying a task execution condition" means, for example, that the measured value is more than the threshold or that the measured value is less than the threshold. Incidentally, the flight route may be determined in consideration of various known viewpoints. For example, a further desirable flight route may be determined from at least one of several viewpoints of the movement distance of the UAV 2, the battery consumption amount of the UAV 2, the required flight time of the UAV 2, and the like.

Moreover, in the flight of the UAV 2 along the flight route, the battery of the UAV 2 may be subjected to charging (for example, aerial charging) or may be not subjected to charging. In the latter case, the predetermined task is executed in one flight, and therefore the flight route is to be determined depending on the flight capacity of the UAV 2 (in other words, the battery remaining amount of the UAV 2). Here, the battery remaining amount of the UAV 2 is an amount obtained by subtracting a battery consumption amount of the UAV 2 from the battery capacity (that is, the battery remaining amount at a time of full charge) of the UAV 2. Incidentally, the battery consumption amount here is the consumption amount of the battery consumed up to the present time.

In this case, the flight route determination unit 33b identifies a plurality of soil sensor units 1 that have provided the measured values satisfying the task execution condition, and determines, on the basis of the battery remaining amount of the UAV 2, a flight route for the UAV 2 to execute the predetermined task. As a result, it is possible to make the UAV 2 execute the predetermined task further efficiently in one flight of the UAV 2 along the determined flight route. For example, the flight route determination unit 33b determines the flight route passing through the position (or the vicinity range of the position) of one or a plurality of soil sensor units 1 identified from the plurality of soil sensor units 1 so that the flight route depends on the battery remaining amount of the UAV 2. Incidentally, the battery information indicating at least one of the battery consumption amount or the battery remaining amount of the UAV 2 may be acquired from the UAV 2 or from the administrator who make the UAV 2 execute the predetermined task.

Moreover, on the basis of the contact sensing data acquired by the sensing data acquisition unit 33a, the flight route determination unit 33b may first identify one or a plurality of sensing areas in which the predetermined task is to be executed (that is, one or a plurality of areas in which execution of the predetermined task is required), and then, on the basis of the one or plurality of identified sensing areas, determine a flight route for the UAV 2 to execute the predetermined task. As a result, it is possible to make the UAV 2 execute the predetermined task further efficiently in the one or plurality of sensing areas along the determined flight route. For example, on the basis of the comparison result between the measured values indicated by the contact sensing data in each of the plurality of sensing areas and a threshold, flight route determination unit 33b identifies one or a plurality of sensing areas satisfying the task execution condition as the sensing area in which the predetermined task is to be executed, and then determines the flight route passing through the one or plurality of identified sensing areas. Here, in a case where a plurality of sensing areas are identified, the flight route also involves the order of the plurality of sensing areas to be reached.

FIG. 8 is a table showing an example of the relationship between measured values indicated by contact sensing data in each of a plurality of sensing areas and the necessity of task execution in the sensing area. FIG. 8 shows the example in which the water amount (measured value) is less than a threshold (5%) in a sensing area No. 2, the temperature (measured value) is more than a threshold (18° C.) in a sensing area No. 3, and the sensing areas No. 2 and No. 3 are identified as a sensing area in which task (such as non-contact sensing) execution is necessary, and the flight route passing through the identified sensing areas No. 2 and No. 3 is determined. Incidentally, a sensing area in which all the measured values of a plurality of properties (for example, the water amount and the temperature) satisfy the task execution condition may be determined as a sensing area in which task execution is necessary.

Moreover, on the basis of the contact sensing data acquired by the sensing data acquisition unit 33a, the flight route determination unit 33b may identify a plurality of candidate areas as a candidate for the sensing area in which the predetermined task is to be executed. In this case, on the basis of a comparison result between the battery remaining amount of the UAV 2 and the battery consumption amount of the UAV 2 in a case where the UAV 2 flies along the flight route for execution of the predetermined task in the plurality of identified candidate areas, the flight route determination unit 33b identifies one or a plurality of sensing areas in which the predetermined task is to be executed. Incidentally, the battery consumption amount here is an estimated battery consumption amount estimated for flight along a flight route.

For example, in the case of flight along a flight route for execution of the predetermined task in a plurality of candidate areas, the flight route determination unit 33b reduces the number of candidate areas until the battery consumption amount is less than the battery remaining amount, and thus finally identifies the sensing area. As a result, it is possible to efficiently identify one or a plurality of sensing areas in which the predetermined task is to be executed. Here, a candidate area having relatively low priority set by the priority setting unit 33c is to be preferentially reduced. As a result, it is possible to identify a sensing area in which execution of the predetermined task is more required. Then, on the basis of one or a plurality of sensing areas finally identified, the flight route determination unit 33b determines a flight route for the UAV 2 to execute the predetermined task.

As another example, the flight route determination unit 33b may determine a flight route for the UAV 2 to execute the predetermined task by selecting one flight route, from a plurality of flight route candidates prepared in advance, on the basis of the contact sensing data acquired by the sensing data acquisition unit 33a. In this case, on the basis of the contact sensing data acquired by the sensing data acquisition unit 33a, the flight route determination unit 33b identifies one or a plurality of candidate areas as a candidate for the sensing area in which the predetermined task is to be executed, and selects the one flight route on the basis of the comparison result between the one or plurality of identified candidate areas and one or a plurality of sensing areas corresponding to (that is, constituting) at least one flight route candidate. As a result, it is possible to reduce the process amount at the time of determining the flight route. For example, the flight route determination unit 33b reduces the number of candidate areas until the resulting one or plurality of candidate areas match one or a plurality of sensing areas corresponding to a flight route candidate, and thus finally determines the one flight route. Also in this case, a candidate area having relatively low priority set by the priority setting unit 33c is to be preferentially reduced.

Figure 9A:
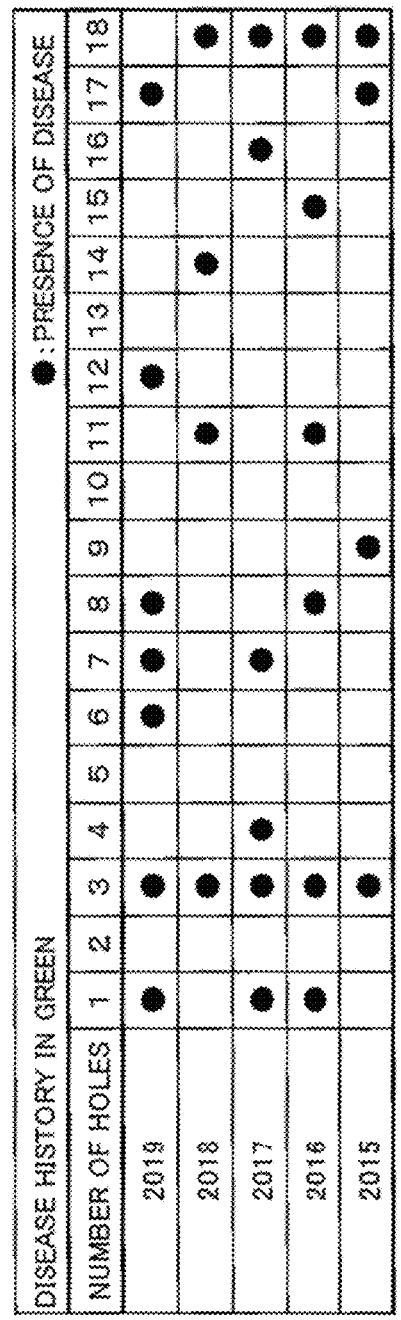
FIG. 9A is a table showing an example of a disease history, in a case where a green is a candidate area, in each green in each year in a past.

The priority setting unit 33c sets the priority of each candidate area as a candidate for the sensing area in which the predetermined task is to be executed. For example, the priority setting unit 33c sets the priority of each candidate area on the basis of the past disease history in each candidate area. As a result, it is possible to identify a sensing area in which execution of the predetermined task is more required from the viewpoint of the past disease history. FIG. 9A is a table showing an example of the disease history, in a case where a green is a candidate area, in each green in each year in the past, and FIG. 9B is a table showing the priority set for each green on the basis of the disease history shown in FIG. 9A. The example in FIG. 9A shows the presence or absence of a disease (for example, a black circle indicates the presence of a disease) in the same period as the period in the range of x days (for example, 15 days) before and after the flight date (for example, Jun. 1, 2020) of the UAV 2 in each green in each year in the past (2015 to 2019). Here, in FIG. 9A, when the presence of a disease scores 5 points in 2019 and the score decreases by 1 point every year from 2019 to 2015, the scores of each green from 2015 to 2019 are totaled, and thus the greens are prioritized and given the priority as shown in FIG. 9B. Incidentally, in the example in FIG. 9B, the priority numbered as "1" is the highest priority.

Figure 10A:
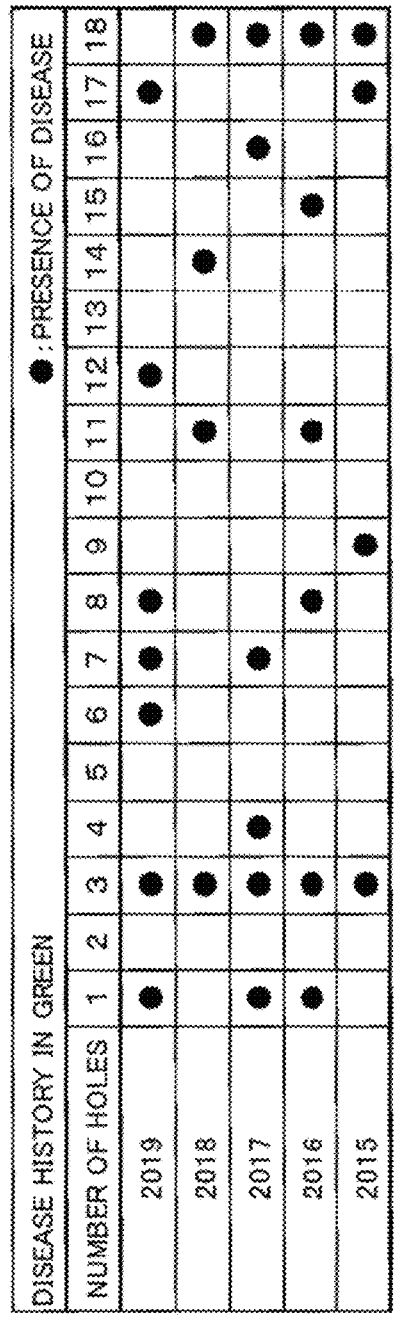
FIG. 10A is a table showing an example of a past disease history, in a case where a green is a candidate area, in each green in each year.

Moreover, the priority setting unit 33c may set the priority of each candidate area on the basis of the past disease history in each candidate area as a candidate for the sensing area in which the predetermined task is to be executed, and in addition, on the basis of the importance level determined on the basis of the discretion of, for example, the administrator. FIG. 10A is a table showing an example of the past disease history, in a case where a green is a candidate area, in each green in each year (in the same manner as in FIG. 9A), FIG. 10B is a table showing an example of the importance level, in the case where a green is a candidate area, of each green, and FIG. 10C is a table showing an example of the priority set for each green on the basis of the disease history shown in FIG. 10A and the importance level shown in FIG. 10B. Here, when, in FIG. 10A, the presence of a disease scores 5 points in 2019 and the score decreases by 1 point every year from 2019 to 2015 and when, in FIG. 10B, the importance level shown as "H" (High) scores 3 points, "M" (Medium) scores 2 points, and "L" (Low) scores 1 point, the scores of each green from 2015 to 2019 are totaled (the scores of the presence of a disease and the scores of the importance level in the past are totaled), and thus the greens are prioritized and given the priority as shown in FIG. 10C.

Moreover, the priority setting unit 33c may set the priority that changes according to the measured value indicated by the contact sensing data acquired by the sensing data acquisition unit 33a. That is, the priority setting unit 33c set the priority so that the level of the priority of a candidate area depends on how much the measured value indicated by the contact sensing data exceeds (or falls below) a threshold. For example, the priority (score) is set to be increased by 1 point every time the temperature exceeds the threshold by 1 degree. Moreover, the priority (score) is set to be increased by 1 point every time the water amount falls below the threshold by 1%. As a result, in a sensing area having a larger difference between the measured value and the threshold, it is possible to perform tasks such as non-contact sensing for detailed investigation and water spraying more preferentially.

Moreover, the priority setting unit 33c may set lower priority as the distance from the reference position to a candidate area is longer. Here, the reference position may be the start point (takeoff point) or the end point (landing point) of the flight of the UAV 2 (the start point and the end point may be the same). As a result, it is possible to suppress the consumption amount of the battery consumed through the flight for the UAV 2 to execute the predetermined task.

The aerial vehicle control unit 33d makes the communication unit 31 transmit control information including flight route information indicating the flight route determined by the flight route determination unit 33b to the UAV 2. Such control information may include a control command that makes the UAV 2 execute the predetermined task. In this case, the control information includes, in addition to the flight route information, a control command that makes the UAV 2 execute non-contact sensing or a control command that makes the UAV 2 execute the aerial application of the application material.

2. Operation of Flight System S

Next, the operation of the flight system S will be described in a first embodiment and a second embodiment separately.

First Embodiment

First, the first embodiment of the operation of the flight system S will be described with reference to FIG. 11. FIG. 11 is a flowchart showing an example of the process of the control unit 33 of the management server 3 in the first embodiment. The first embodiment is an example in the case of identifying a sensing area in which the predetermined task is to be executed.

When the process shown in FIG. 11 starts, the control unit 33 sets a threshold for determination (in other words, judgment) of a task execution condition (for example, the thresholds of the water amount and the temperature) (step S1). Next, the control unit 33 refers to the sensing area database 32a, compares the measured value indicated by the contact sensing data in each of a plurality of sensing areas with the threshold set in the step S1, and identifies the sensing area satisfying the task execution condition as the above-described candidate area on the basis of the comparison result (step S2). Here, it is assumed that a plurality of candidate areas are identified.

Next, the control unit 33 calculates an optimum flight route passing through the candidate areas identified in the step S2 (step S3). Next, the control unit 33 determines (in other words, judges) whether the flight capacity of the UAV 2 is exceeded (that is, whether the task can be sufficiently executed in one flight) on the basis of the flight route determined in the step S3 (step S4). For example, the battery consumption amount of the UAV 2 in a case where the UAV 2 flies along the determined flight route (that is, the estimated battery consumption estimated for flight, along the flight route) is compared with the battery remaining amount of the UAV 2, and as a result of the comparison, if the battery consumption amount exceeds the battery remaining amount, it is determined that the flight capacity of the UAV 2 is exceeded.

Then, if it is determined that the flight capacity of the UAV 2 is not exceeded (step S4: NO), the control unit 33 determines the flight route calculated in the step S3 (step S5), and the process proceeds to a step S7. If it is determined that the flight capacity of the UAV 2 is exceeded (step S4: YES), the control unit 33 eliminates the candidate area having the lowest priority among the candidate areas identified in the step S2 (that is, reduces the number of candidate areas) (step S6), and the process returns to the step S3.

Incidentally, the priority of the candidate areas may be set, by the priority setting unit 33c, before the start of the process or in the step S6 shown in FIG. 11. Alternatively, in the step S6, the priority of the candidate areas may be not used. In this case, for example, the control unit 33 may randomly eliminate one candidate area among the candidate areas identified in the step S2.

When the process returns to the step S3, the control unit 33 calculates an optimum flight route passing through the candidate areas identified in the step S2 excluding the candidate area eliminated in the step S6, and then performs the process of the step S4. In this way, the number of candidate areas is reduced until the battery consumption amount in the case of flight along the flight route is equal to or less than the battery remaining amount.

In the step S7, the control unit 33 makes the communication unit 31 transmit control information including flight route information indicating the flight route determined in the step S5 to the UAV 2. The UAV 2 receives the transmitted control information, then flies along the flight route indicated by the flight route information, and executes the predetermined task in the sensing area under the flight route. For example, in the case of executing non-contact sensing as a task, the UAV 2 lowers the flight altitude and executes non-contact sensing, and after the non-contact sensing, raises the flight altitude and flies.

Incidentally, the non-contact sensing data obtained through the non-contact sensing by the UAV 2 is transmitted from the UAV 2 to the management server 3. As a result, the management server 3 can estimate the state of the sensing target on the basis of the non-contact sensing data from a viewpoint different from the viewpoint of the contact sensing by the soil sensor unit 1. For example, from at least one of the RGB value, the NDVI value, or the temperature of a plant (stem or leaf) identified by the non-contact sensing data, good or bad of the plant (that can be regarded as good or bad of the soil) is estimated as the state of the plant at that time. Then, on the basis of the estimated state, for example, aerial application of an application material is determined as the treatment to be performed on the sensing target.

Second Embodiment

Figure 12:
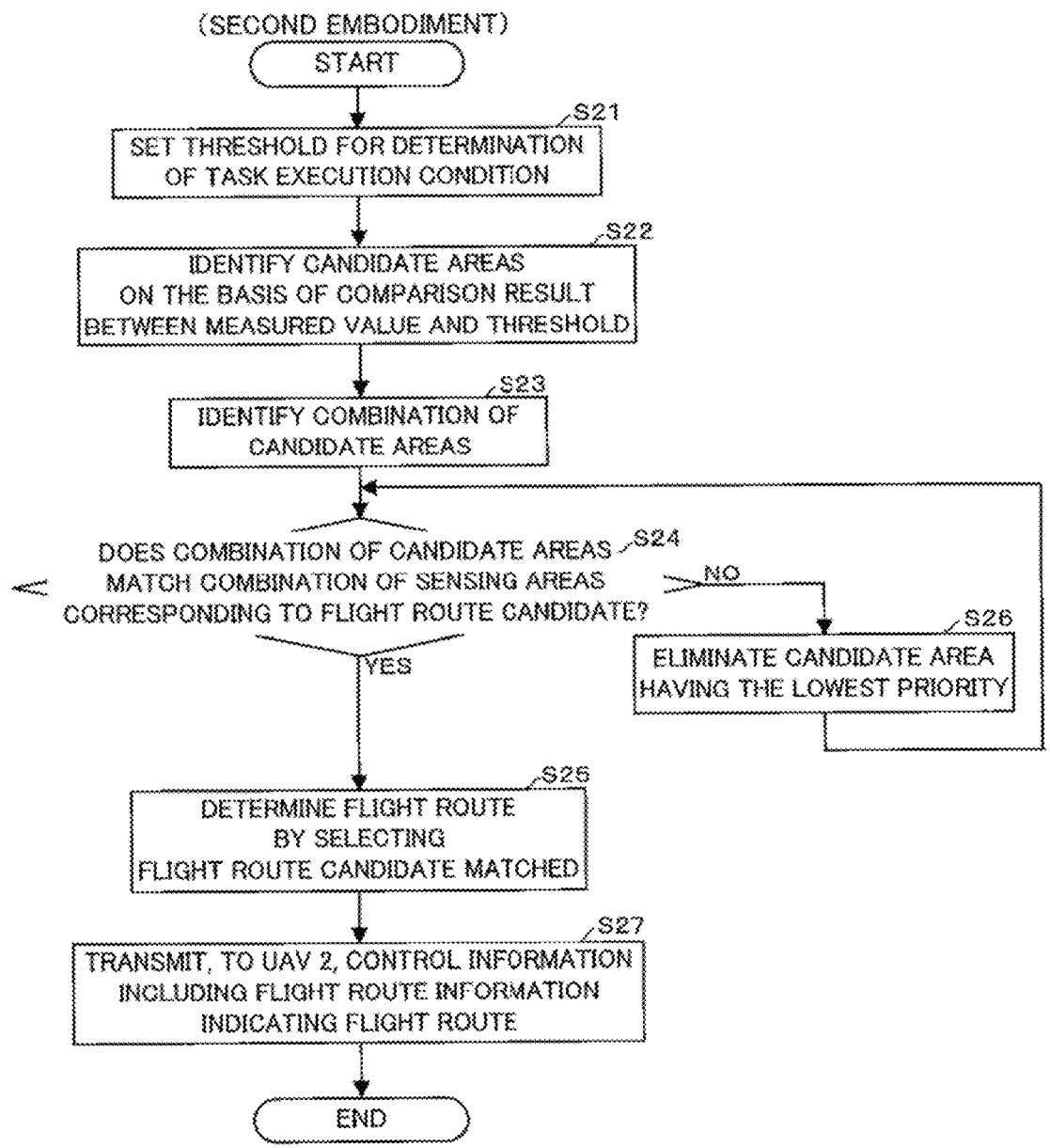
FIG. 12 is a flowchart showing an example of the process of the control unit 33 of the management server 3 in a second embodiment.

Next, the second embodiment of the operation of the flight system S will be described with reference to FIG. 12. FIG. 12 is a flowchart showing an example of the process of the control unit 33 of the management server 3 in the second embodiment. The second embodiment is, like the first embodiment, an example in the case of identifying a sensing area in which the predetermined task is to be executed. However, the second embodiment is different from the first embodiment in that a plurality of flight route candidates are prepared in advance. For example, all combinations of sensing areas are identified in advance so that the flight capacity is net exceeded, and flight route candidates corresponding to the identified combinations are prepared.

Here, the combination of sensing areas may involve the order of the sensing areas to be reached by considering the wind direction and the like. For example, according to the wind direction, the flight capacity is exceeded when the UAV 2 moves from a sensing area No. 1 to a sensing area No. 2, whereas the flight capacity is not exceeded when the UAV 2 moves from the sensing area No. 2 to the sensing area No. 1 in some cases. Moreover, the combination of sensing areas may include only one sensing area. Incidentally, the flight route candidates may be calculated by a computer or identified empirically by a person.

When the process shown in FIG. 12 starts, the control unit 33 sets a threshold for determination of a task execution condition (for example, the thresholds of the water amount and the temperature) (step S21). Next, the control unit 33 refers to the sensing area database 32a, compares the measured value indicated by the contact sensing data in each of a plurality of sensing areas with the threshold set in the step S21, and identifies the sensing area satisfying the task execution condition as the above-described candidate area on the basis of the comparison result (step S22). Incidentally, here, it is assumed that a plurality of candidate areas are identified.

Next, the control unit 33 identifies a combination of the candidate areas identified in the step S22 (step S23). Here, the combination of the sensing areas may involve the order of the sensing areas to be reached. For example, the combination "No. 2→No. 3→No. 4" is identified as the combination of the identified candidate areas.

Alternatively, the combinations "No. 2→No. 3→No. 4", "No. 3→No. 2→No. 4", "No. 4→No. 3→No. 2", and the like may be identified as a plurality of combinations of the identified candidate areas.

Next, the control unit 33 compares the combination of the candidate areas identified in the step S23 with the combination of sensing areas corresponding to at least one flight route candidate prepared in advance, and determines (in other words, judges) whether the combination of the candidate areas matches the combination of sensing areas corresponding to a flight route candidate on the basis of the comparison result (step S24).

If it is determined that the combination of the candidate areas matches the combination of sensing areas corresponding to a flight route candidate (step S24: YES), the control unit 33 determines a flight route by selecting the flight route candidate determined (judged) to be matched in the step S24 (step S25), and the process proceeds to a step S27. If it is determined that the combination of the candidate areas does not match the combination of sensing areas corresponding to a flight route candidate (step S24: NO), the control unit 33 eliminates the candidate area having the lowest priority set in the same manner as in the first embodiment or randomly eliminates one candidate area among the candidate areas identified in the step S22 (step S26), and the process returns to the step S24.

Incidentally, in a case where a plurality of combinations of candidate areas are identified, if it is determined that a certain combination does not match the combination of sensing areas corresponding to a flight route candidate (step S24: NO), it may be determined whether the remaining combinations that are not yet determined match the combination of sensing areas corresponding to a flight route candidate. In this case, only if it is determined that all the combinations identified in the step S23 do not match the combination of sensing areas corresponding to a flight route candidate, the process proceeds to the step S26, a candidate area is eliminated, and the process returns to the step S24.

When the process returns to the step S24, the control unit 33 determines whether the combination of the candidate areas identified in the step S23 excluding the candidate area eliminated in the step S2C matches any combination of sensing areas corresponding to a flight route candidate. In this way, the number of candidate areas is reduced until the combination of the candidate areas matches the combination of sensing areas corresponding to a flight route candidate.

For example, when the combinations of sensing areas corresponding to a flight route candidate prepared in advance are the combinations "No. 4→No. 2→No. 3","No. 2→No. 4→No. 3", "No. 3→No. 4→No. 2", "No. 4→No. 2", "No. 2→No. 4", "No. 4→No. 3", "No. 3→No. 4", "No. 2→No. 3", "No. 3→No. 2", "No. 4", "No. 2", and "No. 3", and the combination of the candidate areas is the combination "No. 2→No. 3→No. 4", it is determined in the step S24 in the first round that there is no match (note that it is assumed that there is one combination of the candidate areas). Therefore, in the step S26, any one of the candidate areas No. 2, No. 3,and No. 4 is eliminated, and if the candidate area No. 4 is eliminated, it is determined in the step S24 in the second round that the combination of sensing areas corresponding to a flight route candidate "No. 2→No. 3" is matched.

Incidentally, it is assumed that there is a case in which, in the step S26, even when one candidate area finally remains after elimination of candidate areas, it is determined in the step S24 that there is no match. In this case, the process may end under the determination that there is no sensing area in which the predetermined task is to be executed (not applicable), or the process may return to the step S23 for setting a threshold again to identify a new combination of sensing areas and proceed to the step S24 and the steps thereafter. In the step S27, the process is performed in the same manner as in the step S7 in the first embodiment.

The second embodiment described above is more effective than the first embodiment particularly in a case where the battery capacity of the UAV 2 is not so large. In the second embodiment, there is a burden of preparing N numbers of combinations of sensing areas (that is, N numbers of flight route candidates) in advance so that the flight capacity is not exceeded, but the process amount at the time of determining the flight route can be smaller than in the first embodiment because calculation of the flight route and estimation of the battery consumption amount are unnecessary.

As described above, according to the above-described embodiments, the flight system S is configured to acquire the contact sensing data obtained by the contact sensing of the soil sensor unit 1 embedded in advance in the ground, and determine, on the basis of the contact sensing data, a flight route for the UAV 2 to execute the predetermined task, and therefore can make the UAV 2 execute the predetermined task further efficiently along the determined flight route. As a result, soil and plants in the sensing area can be managed further efficiently.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above-described embodiments, an example is described in a case where the management server 3 determines a flight route for execution of the predetermined task on the basis of the contact sensing data obtained by the contact sensing of the soil sensor unit 1. However, the control unit 25 of the UAV 2 may be configured to acquire the contact sensing data and determine a flight route for execution of the predetermined task on the basis of the contact sensing data. Moreover, in the above-described embodiments, an example of an unmanned aerial vehicle is described as an aerial vehicle capable of unmanned flight, but the aerial vehicle capable of unmanned flight is also applicable to a manned aerial vehicle that can fly without an operator (pilot) in the vehicle.

REFERENCE SIGNS LIST

1 Soil sensor unit
2 UAV
3 Management server
11 Contact sensor
12 Data transmission unit
21 Drive unit
22 Radio communication unit
23 Sensor unit
24 Positioning unit
25 Control unit
25a Task control unit
25b Flight control unit
31 Communication unit
32 Storage unit
33 Control unit
33a Sensing data acquisition unit
33b Flight route determination unit
33c Priority setting unit
33d Aerial vehicle control unit
S Flight system

What is claimed is:

1. A flight system comprising:
an aerial vehicle capable of unmanned flight, the aerial vehicle being configured to execute a predetermined task during flight;
a plurality of contact sensors configured to obtain contact sensing data, the plurality of contact sensors comprising a first contact sensor configured to be embedded in ground in advance and perform contact sensing of at least one sensing target of soil or a plant, wherein the plurality of contact sensors correspond respectively to a plurality of areas, and the contact sensing data comprises measurement data;
at least one memory configured to store program code; and
at least one processor configured to access the program code and operate as instructed by the program code, the program code including determination code configured to cause at least one processor to:
 identify, using the contact sensing data corresponding respectively to the plurality of areas, one or more areas of the plurality of areas in which the predetermined task is to be executed, and
 determine, based on the one or more areas identified using the contact sensing data, a flight route for the aerial vehicle to execute the predetermined task,
wherein the determination code is further configured to cause the at least one processor to identify, on the basis of the contact sensing data, a plurality of candidate areas as a candidate for an area in which the predetermined task is to be executed, to compare a battery remaining amount with a battery consumption amount of the aerial vehicle in a case where the aerial vehicle flies along a flight route for execution of the predetermined task in the plurality of candidate areas, and to identify, on the basis of a result of the comparison, one or a plurality of areas in which the predetermined task is to be executed.

2. The flight system according to claim 1, wherein the determination code causes the at least one processor to reduce a number of the plurality of candidate areas until, in the case where the aerial vehicle flies along a flight route for execution of the predetermined task in the plurality of candidate areas, the battery consumption amount is less than the battery remaining amount.

3. The flight system according to claim 1, wherein the determination code causes the at least one processor to determine the flight route by selecting one flight route, on the basis of the contact sensing data, from a plurality of flight route candidates prepared in advance.

4. The flight system according to claim 3, wherein the determination code causes the at least one processor to identify, on the basis of the contact sensing data, one or a plurality of candidate areas as a candidate for an area in which the predetermined task is to be executed, to compare the one or plurality of candidate areas with one or a plurality of areas corresponding to at least one of the plurality of flight route candidates, and to select the one flight route on the basis of a result of the comparison.

5. The flight system according to claim 4, wherein the determination code causes the at least one processor to reduce a number of the one or plurality of candidate areas until the one or plurality of candidate areas match the one or plurality of areas corresponding to the flight route candidates.

6. The flight system according to claim 2, wherein the determination code causes the at least one processor to eliminate one of the plurality of candidate areas, the one having priority relatively low.

7. The flight system according to claim 6, the program code further including setting code configured to cause at least one processor to set the priority on the basis of a past disease history in the one of the plurality of candidate areas.

8. The flight system according to claim 6, the program code further including setting code configured to cause at least one processor to set the priority that changes according to a value indicated by the contact sensing data.

9. The flight system according to claim 6, the program code further including setting code configured to cause at least one processor to set the priority that is lower as a distance from a reference position to the one of the plurality of candidate areas is longer.

10. The flight system according to claim 1, further comprising a controller configured to make the aerial vehicle execute the predetermined task.

11. The flight system according to claim 10, wherein the controller makes the aerial vehicle execute aerial non-contact sensing of a ground surface as the predetermined task.

12. The flight system according to claim 11, wherein the controller makes the aerial vehicle lower a flight altitude of the aerial vehicle to execute the aerial non-contact sensing, and after the aerial non-contact sensing, makes the aerial vehicle raise the flight altitude to fly.

13. The flight system according to claim 11, wherein a target of the aerial non- contact sensing is a plant growing from ground in an area accessible to a person.

14. The flight system according to claim 10, wherein the controller makes the aerial vehicle execute aerial application of an application material as the predetermined task.

15. A flight route determination method executed by one or a plurality of computers, the method including:
acquiring contact sensing data obtained by contact sensing of at least one sensing target of soil or a plant, the contact sensing performed by a plurality of contact sensors configured to obtain contact sensing data, the plurality of contact sensors comprising a first contact sensor embedded in ground in advance, wherein the plurality of contact sensors correspond respectively to a plurality of areas, and the contact sensing data comprises measurement data;
identifying, using the contact sensing data corresponding respectively to the plurality of areas, one or more areas in which a predetermined task is to be executed; and
determining, based on the one or more areas identified using the contact sensing data , a flight route for an aerial vehicle capable of unmanned flight to execute the predetermined task,
wherein the flight route determination method further comprises, on the basis of the contact sensing data, identifying a plurality of candidate areas as a candidate for an area in which the predetermined task is to be executed, comparing a battery remaining amount with a battery consumption amount of the aerial vehicle in a case where the aerial vehicle flies along a flight route for execution of the predetermined task in the plurality of candidate areas, and identifying, on the basis of a result of the comparison, one or a plurality of areas in which the predetermined task is to be executed.

16. A flight route determination device comprising:
at least one memory configured to store program code; and at least one processor configured to access the program code and operate as instructed by the program code, the program code including:
acquisition code configured to cause at least one processor to acquire contact sensing data obtained by contact sensing of at least one sensing target of soil or a plant, the contact sensing performed by a plurality of contact sensors configured to obtain contact sensing data, the plurality of contact sensors comprising a first contact sensor embedded in ground in advance, wherein the plurality of contact sensors correspond respectively to a plurality of areas, and the contact sensing data comprises measurement data;
identification code configured to cause at least one processor to identify, using the contact sensing data corresponding respectively to the plurality of areas, one or more areas in which a predetermined task is to be executed; and
determination code configured to cause at least one processor to determine, based on the one or more areas identified using the contact sensing data, a flight route for an aerial vehicle capable of unmanned flight to execute the predetermined task,
wherein the determination code is further configured to cause the at least one processor to identify, on the basis of the contact sensing data, a plurality of candidate areas as a candidate for an area in which the predetermined task is to be executed, to compare a battery remaining amount with a battery consumption amount of the aerial vehicle in a case where the aerial vehicle flies along a flight route for execution of the predetermined task in the plurality of candidate areas, and to identify, on the basis of a result of the comparison, one or a plurality of areas in which the predetermined task is to be executed.

17. A flight system comprising:
an aerial vehicle capable of unmanned flight, the aerial vehicle being configured to execute a predetermined task during flight;
a plurality of contact sensors configured to obtain contact sensing data, the plurality of contact sensors comprising a first contact sensor configured to be embedded in ground in advance and perform contact sensing of at least one sensing target of soil or a plant, wherein the plurality of contact sensors correspond respectively to a plurality of areas, and the contact sensing data comprises measurement data;
at least one memory configured to store program code; and
at least one processor configured to access the program code and operate as instructed by the program code, the program code including determination code configured to cause at least one processor to:
identify, using the contact sensing data corresponding respectively to the plurality of areas, one or more areas of the plurality of areas in which the predetermined task is to be executed, and
determine, based on the one or more areas identified using the contact sensing data, a flight route for the aerial vehicle to execute the predetermined task,
the program code further including setting code configured to cause at least one processor to set a priority associated with a past disease history,
wherein the processor is further configured to identify the one or more areas using the priority associated with the past disease history,
wherein a priority for the flight route to include a first area is higher the higher a first score associated with the first area, and
wherein the first score corresponds to a first past disease history of the first area.

18. A flight route determination method executed by one or a plurality of computers, the method including:
acquiring contact sensing data obtained by contact sensing of at least one sensing target of soil or a plant, the contact sensing performed by a contact sensor embedded in ground in advance; and
determining, based on the contact sensing data, a flight route for an aerial vehicle capable of unmanned flight to execute a predetermined task, wherein the flight route is determined by selecting one flight route from a plurality of flight route candidates prepared in advance.

* * * * *